United States Patent [19]

Anglin

[11] 4,137,863
[45] Feb. 6, 1979

[54] READING INSTRUMENT

[76] Inventor: Russell E. Anglin, 6157 Cottle Rd., San Jose, Calif. 95123

[21] Appl. No.: 786,796

[22] Filed: Apr. 12, 1977

[51] Int. Cl.² ............... B41J 11/64; B42D 9/00; G02B 27/02
[52] U.S. Cl. ............... 116/306; 40/352; 40/600; 116/240; 281/DIG. 1; 350/245
[58] Field of Search ............... 116/119; 40/352, 341, 40/600; 350/115, 116; 281/42, DIG. 1

[56] References Cited

U.S. PATENT DOCUMENTS

| | | | |
|---|---|---|---|
| 2,604,009 | 7/1952 | Walrath | 40/341 |
| 2,763,241 | 9/1956 | Waggoner | 40/352 |
| 3,089,464 | 5/1963 | Mendels | 40/352 |
| 3,126,862 | 3/1964 | Hanley | 116/119 |
| 3,129,695 | 4/1964 | Adelman | 116/119 |
| 3,269,752 | 8/1966 | Lindaman | 116/119 X |
| 3,408,977 | 11/1968 | Colman, Jr. | 116/119 |
| 3,704,938 | 12/1972 | Fanselow | 350/116 X |
| 3,712,712 | 1/1973 | Bosma | 116/119 X |
| 3,739,739 | 6/1973 | Brase | 40/352 |

Primary Examiner—Daniel M. Yasich
Attorney, Agent, or Firm—Paul L. Hickman

[57] ABSTRACT

A reading instrument for magnifying certain chosen printed material on a page or sheet of paper and for visually isolating the chosen material from other, adjacent printed material, the instrument including an opaque plate that is provided with a slot, an elongated magnifying lens attached to the plate in alignment with the slot, a permanent magnet spaced from the lens and attached to the plate and a flat lamina of a ferrous material that is positioned under the printed page so as to inhibit the plate from sliding along or falling off of the page due to its magnetic attraction to the lamina.

5 Claims, 3 Drawing Figures

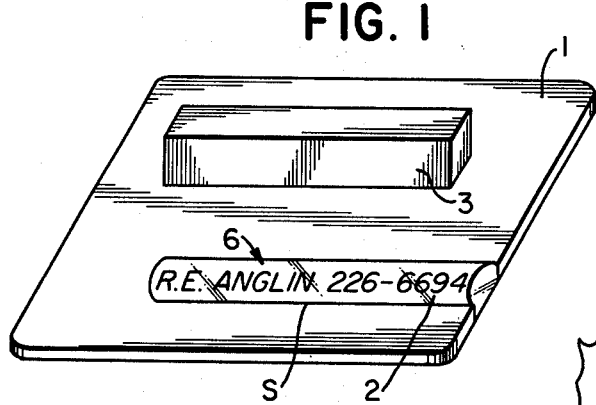
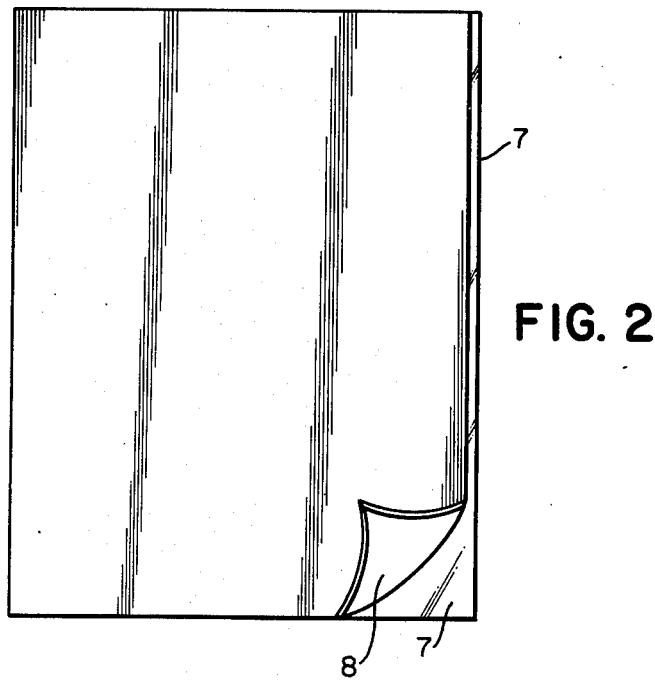

READING INSTRUMENT

BACKGROUND OF THE INVENTION

1. Field of the Invention

This invention relates generally to reading aids and more particularly to reading aids that visually isolate printed material on a portion of a printed page from printed material on adjacent portions of the page.

2. Discussion of the Prior Art

There are many instances where the printed material on a page is difficult to read because the print used is small or of a high density (i.e., the printed material runs compactly together). For example, printed on a page of a large, metropolitan telephone book or directory are many hundreds of names and addresses which are often confusingly close to one another.

Furthermore, on high density printed pages it is often very hard to keep track of the position of certain printed material on the page. Again using the telephone directory as an example, often times a number is looked up by a person and then lost if the person should become distracted.

A number of prior art patents address one or the other of the above stated problems. Typically, the prior art discloses various means for visually isolating certain printed material by blocking out or shading unwanted printed material.

Applicant wishes to make of record the following U.S. patents as the closest known prior art: U.S. Pat. Nos. 1,353,279; 1,658,499; 3,126,862; 3,269,752; 3,408,977; and 3,739,739.

SUMMARY OF THE INVENTION

It is an object of this invention to provide an improved reading instrument which magnifies and visually isolates certain chosen printed material on a page from unwanted, adjacent printed material and which continues to isolate the chosen material so that a person will not loose track of it even if he should become distracted.

Another object of this invention is to provide a reading instrument which is simple to construct, economical to manufacture and simple to use.

Briefly, my invention comprises: a magnifying assembly including an elongated lens positioned in alignment with a slot formed in an opaque plate, means for attaching the lens to the plate and a permanent magnet spaced from the lens and attached to the plate; and a flat lamina of ferrous material that is operationally disposed proximate to said magnifying assembly.

An advantage of this invention is that the magnifying assembly is inhibited from moving due to its magnetic attraction to said lamina.

Another advantage of this invention is that the magnifying assembly both isolates and magnifies the chosen printed matter.

These and other objects and advantages of the present invention will no doubt become clear after a reading of the following detailed description as accompanied by the several figures of the drawing.

IN THE DRAWING

FIG. 1 is a perspective view of the magnifying assembly of a reading instrument in accordance with the present invention;

FIG. 2 is a plan view of the lamina of a reading instrument in accordance with the present invention; and FIG. 3 is a plan view of a part of a page from a telephone directory.

DESCRIPTION OF THE PREFERRED EMBODIMENT

The reading instrument shown generally in FIGS. 1 and 2 is primarily designed to be used on a standard, four coulumn telephone directory, although it is no limited to such. Referring specifically to FIG. 1, the magnifying assembly of the instrument is shown to include a plate of material 1, an elongated plano-convex lens 2 (i.e., one surface portion of the lens is planar and the other surface portion is convex) and a permanent bar magnet 3.

Plate 1 is formed from a smooth, rigid, opaque and non-ferrous material such as a non-transparent plastic and preferably measures two inches by three inches. It is provided with an elongated slot S within which lens 2 is preferably disposed. The lens is attached to the plate by a suitable adhesive.

The lens itself is a half round acrylic rod preferably one quarter of an inch wide by two and one half inches long. Of course, plano-convex lenses made from other materials, such as other plastics or glass, would also be suitable for this invention.

Bar magnet 3 serves both as a handle for the magnifying assembly and as a means for holding the assembly on the printed page. Both functions will be discussed in greater detail with reference to FIG. 3.

Referring now to FIG. 2, a lamina 7 constructed from a ferrous material such as iron or steel is shown. Preferably, the dimensions of the lamina is about eight and one half inches by eleven inches. The lamina may optionally be covered by a paper cover 8, shown here partially peeled back, for the recording of information.

FIG. 3 illustrates a part of a page from a telephone directory having a column with a first set of telephone number lines 4, a second set of telephone number lines 5 and a telephone number line 6. To use the reading instrument of the present invention, lamina 7 is placed beneath the telephone book page and the magnifying assembly is placed on the upper surface of the page. A user then grasps the assembly by magnet 3 and moves it across the page until slot S and lens 2 are aligned with line 6. As shown in FIG. 1, lens 2 magnifies line 6 and visually blocks out the first set of lines 4 and the second set of lines 5.

The friction between the magnifying assembly and the telephone book page as caused by the weight of the assembly and by the magnetic attraction between the assembly and the lamina prevents the assembly from accidently sliding along or falling off of the page. The magnet 3 is selected to have a magnetic force great enough to cause considerable attraction to the lamina even through several pages or sheets of paper, and yet which is not so great as to make the magnifying assembly difficult to move when only a single page separates the assembly from the lamina.

While this invention has been described in terms of a single, preferred embodiment, it is contemplated that various modifications thereof will become apparent after having read the preceding detailed description. For instance, specific dimensions and materials of construction were mentioned for the purpose of illustration, and should not be considered limiting.

It is therefore intended that the following appended claims be interpreted as covering all such modifications as fall within the true spirit and scope of the present invention.

What is claimed is:

1. A reading instrument for magnifying certain, selected printed material on the upper surface of a sheet of paper and for visually isolating said certain material from other, adjacent printed material on said upper surface, the instrument comprising:
   a magnifying assembly including
   an elongated, plano-convex lens means formed from a half round rod of a lens quality substance,
   a flat, non-ferrous, opaque plate provided with an elongated slot,
   means for attaching said lens means to said plate in alignment with said slot so that any printed material seen through said slot is magnified by said lens means, and
   a permanent magnet spaced from said lens means and attached to said plate and serving as a handle for said plate; and
   a flat lamina of a ferrous material which is operationally disposed close enough to said magnifying assembly so as to be magnetically attracted to said magnet to a substantial degree;
   whereby when said lamina is positioned beneath a lower surface of said paper and said magnifying assembly is positioned against said upper surface, the assembly is inhibited from sliding by the frictional force between said assembly and said paper caused by the weight of said assembly and by the magnetic attraction between said assembly and said lamina, and where certain printed material on said upper surface may be magnified and isolated from other printed material on said upper surface by grasping said magnet and positioning said slot and said lens over said certain, selected material.

2. A reading instrument as recited in claim 1 wherein said lens means is a half round rod of acrylic plastic.

3. A reading instrument as recited in claim 1 wherein said elongated slot is configured to receive said lens means.

4. A reading instrument as recited in claims 1 wherein said means for attaching said lens means to said plate includes an adhesive disposed between a surface of said lens means and a surface of said plate.

5. A reading instrument as recited in claim 1 further comprising a sheet of paper attached to a surface of said lamina.

* * * * *